(12) United States Patent
Moon et al.

(10) Patent No.: US 8,441,974 B2
(45) Date of Patent: May 14, 2013

(54) METHOD OF PROVIDING MULTICAST BROADCAST SERVICE

(75) Inventors: Jung-Mo Moon, Daejeon (KR); Mi-Young Yun, Daejeon (KR); Sang-Ho Lee, Daejeon (KR)

(73) Assignees: Samsung Electronics Co., Ltd., Suwon-si (KR); Electronics and Telecommunications Research Inst., Daejeon (KR)

( * ) Notice: Subject to any disclaimer, the term of this patent is extended or adjusted under 35 U.S.C. 154(b) by 881 days.

(21) Appl. No.: 12/517,988

(22) PCT Filed: Sep. 7, 2007

(86) PCT No.: PCT/KR2007/004347
§ 371 (c)(1),
(2), (4) Date: Jun. 5, 2009

(87) PCT Pub. No.: WO2008/069410
PCT Pub. Date: Jun. 12, 2008

(65) Prior Publication Data
US 2010/0315985 A1    Dec. 16, 2010

(30) Foreign Application Priority Data
Dec. 8, 2006  (KR) .................. 10-2006-0124585

(51) Int. Cl.
H04H 20/71 (2008.01)
(52) U.S. Cl.
USPC ........... 370/312; 726/2; 726/3; 726/4; 726/14

(58) Field of Classification Search .................. 370/312, 370/432; 726/2–4, 14; 713/162, 163, 168; 380/270; 379/142.05; 455/410, 411
See application file for complete search history.

(56) References Cited

U.S. PATENT DOCUMENTS

| | | | |
|---|---|---|---|
| 2004/0180681 A1* | 9/2004 | Jeong et al. | 455/503 |
| 2004/0185837 A1* | 9/2004 | Kim et al. | 455/414.3 |
| 2004/0203816 A1 | 10/2004 | Bae et al. | |
| 2005/0075124 A1 | 4/2005 | Willenegger et al. | |
| 2005/0097595 A1* | 5/2005 | Lipsanen et al. | 725/25 |
| 2006/0168446 A1 | 7/2006 | Ahonen et al. | |
| 2008/0112352 A1* | 5/2008 | Kuo | 370/312 |
| 2009/0080351 A1* | 3/2009 | Ryu et al. | 370/312 |

FOREIGN PATENT DOCUMENTS

| | | | |
|---|---|---|---|
| KR | 10-2002-0071111 A | 9/2002 | |
| KR | 10-2003-0008681 A | 1/2003 | |
| KR | 10-2005-0107256 A | 11/2005 | |
| KR | 10-2006-0034473 A | 4/2006 | |
| WO | 2006/011763 A2 | 2/2006 | |
| WO | 2006/085732 A1 | 8/2006 | |

* cited by examiner

*Primary Examiner* — Mark Rinehart
*Assistant Examiner* — Mang Yeung
(74) *Attorney, Agent, or Firm* — Jefferson IP Law, LLP

(57) ABSTRACT

The present invention relates to a method of providing a multicast broadcast service. A message for providing an MBS (Multicast Broadcast Service) between network constituent elements is defined by applying a message defined in a wireless channel, and functions and parameters to be performed by the network constituent elements are defined. Therefore, the MBS can be provided in a wideband wireless access network that is a field of a mobile communication system and includes a wire channel.

11 Claims, 5 Drawing Sheets

METHOD OF PROVIDING MULTICAST BROADCAST SERVICE

TECHNICAL FIELD

The present invention relates to a mobile communication system, and more particularly, to a method of providing a multicast broadcast service.

BACKGROUND ART

In general, a multicast broadcast service (hereinafter referred to as MBS) is a point-to-multipoint service in which data is transmitted from a single source to a plurality of recipients. In the MBS, a common resource is used to efficiently use a wireless resource and a wire resource. The MBS is a unidirectional service.

In particular, in a wideband wireless access network that is a field of a mobile communication system, in order for a plurality of recipients to commonly use a resource, a CID (Connection ID) that is an identifier of packets that are transmitted through a wireless channel is defined as a multicast CID (hereinafter, mCID). If a plurality of mobile terminals that receive a multicast service share the mCID, the plurality of mobile terminals can receive multicast packets.

Here, the MBS is classified into two types according to structures of cells. One is a single base station (BS) connection method in which a single BS only transmits multicast packets. The other is a multi-BS connection method in which a plurality of BSs simultaneously transmits the same packet.

In the multi-BS connection, a group of BSs that simultaneously transmit the same packet is defined as a multicast broadcast service zone (MBS zone). A plurality of mobile terminals in one MBS zone has the same mCID regardless of whether the mobile terminals are activated or not. Even if the BS is changed, the mobile terminals can receive multicast packets without being registered again in a new BS through the mCID. However, the MBS is only provided in a downlink and an ARQ (Automatic Repeat Request) is not applied.

Further, in order to provide the MBS to the mobile terminals in the wideband wireless access network, a control procedure and a transmission method of providing the MBS between constituent elements need to be defined. Messages and parameters in the wireless channel are already defined by IEEE 802.16e. In order to provide the MBS, a message function and a message processing method need to be defined again. Since messages and parameters in a wire channel are not standardized, it is required to standardize the messages and parameters in the wireless channel.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of providing a multicast broadcast service, having advantages of providing the multicast broadcast service to a plurality of mobile terminals through transmitting and receiving of messages through a wireless channel and a wire channel.

Technical Solution

An exemplary embodiment of the present invention provides a method of providing a multicast broadcast service (MBS) from an MBS server to a mobile terminal. The method includes: creating an MBS registration request message for a program of an MBS that the mobile terminal desires to receive; transmitting the MBS registration request message to the MBS server that provides the corresponding MBS; receiving an MBS registration response message from the MBS server, the MBS registration response message including a security relationship identifier indicating information on an access authority of the mobile terminal with respect to the program of the MBS; transmitting a request message of a multicast traffic key corresponding to the security relationship identifier to the MBS server according to whether the security relationship identifier included in the MBS registration response message is set or not; and causing the MBS server to perform an authentication process on the mobile terminal, receiving a multicast traffic key response message including the multicast traffic key that is created by performing the authenticating process, storing the multicast traffic key, and transmitting a response message to the mobile terminal to complete a service registering process for receiving the corresponding MBS.

Another embodiment of the present invention provides a method of providing a multicast broadcast service (MBS) to a mobile terminal by linking the mobile terminal to a MBS server in a mobile communication system. The method includes establishing a traffic connection to transmit a program of the MBS between mobile terminals and a MBS server, transmitting the program of the MBS to the mobile terminal through the control station by using the traffic connection, and releasing the traffic connection if the program of the MBS is completely transmitted.

ADVANTAGEOUS EFFECTS

According to the above-described exemplary embodiment of the present invention, a message for providing the MBS between the network constituent elements is defined by applying the message defined in the wireless channel, and the MBS can be provided in the wideband wireless access network that includes a wire channel by defining functions to be performed by the constituent elements and the necessary parameters.

MODE FOR THE INVENTION

Figure 1:
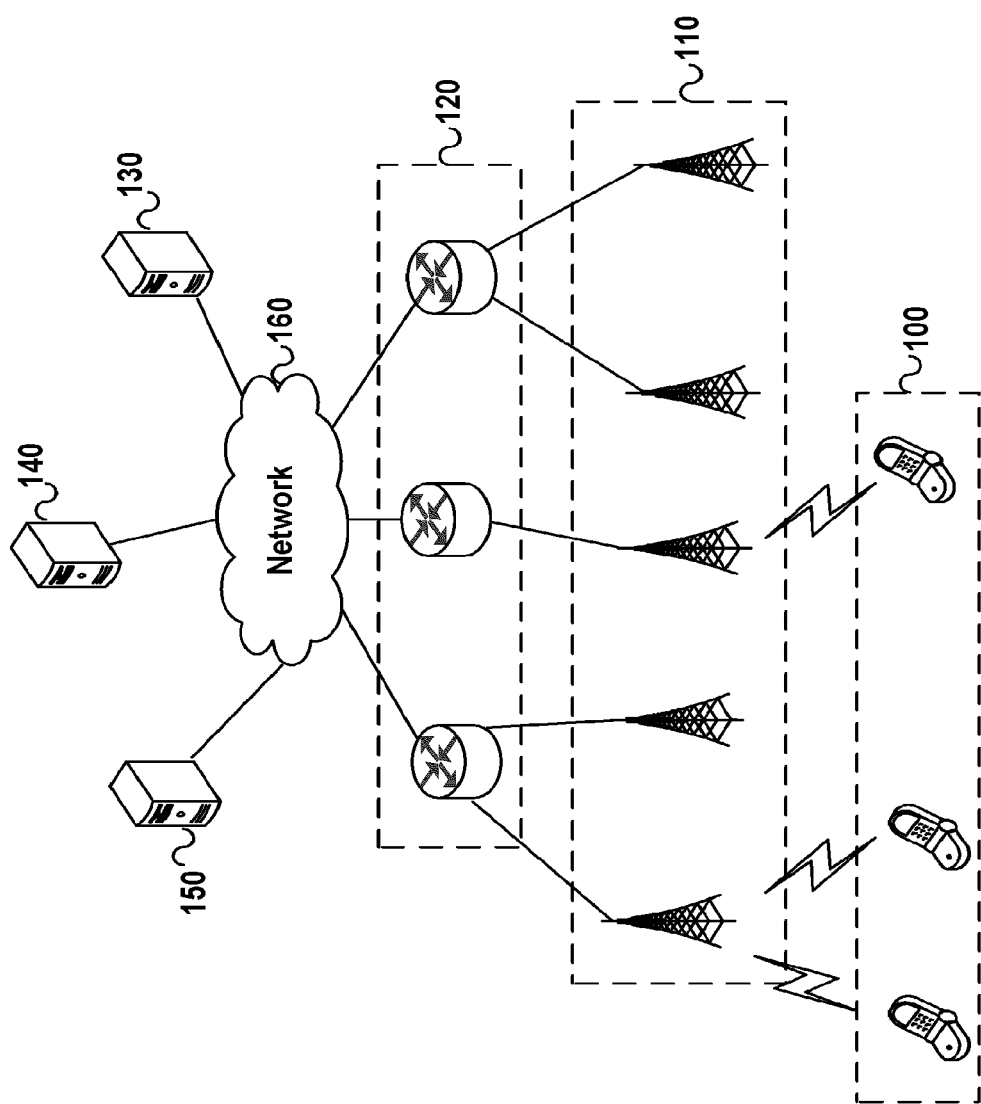
FIG. 1 is a configuration diagram of a network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In an exemplary embodiment of the present invention, a service registering process for providing a multicast broadcast service (hereinafter referred to as MBS), a security key creating process, an MBS connection setting process, an MBS connection releasing process, and a service releasing process will be described. Further, the description is given to information and message processing methods that are required in the respective processes. In the exemplary embodiment of the present invention, a wideband wireless access network that is a field of a mobile communication system will be exemplified.

FIG. 1 is a configuration diagram of a network according to an exemplary embodiment of the present invention.

As shown in FIG. 1, in a wideband wireless access network, mobile terminals (PSS: Portable Subscriber Station) 100 that access a multicast service application are connected to base stations (RAS: Radio Access Station) 110 that perform a control operation in a wireless channel. The base stations 110 are connected to control stations (ACR: Access Control Router) 120 that control the base stations 110 by a wire communication.

The wideband wireless access network has a hierarchical structure in which the base stations 110 are exemplarily disposed in a hot-spot area of a downtown area and manage a plurality of mobile terminals and the control station 120 manages the plurality of base stations in a centralized method. The plurality of control stations 120 are directly connected to a network 160 that is the public Internet. In order to provide an IP mobility, the plurality of control stations 120 link with a home agent (HA) 140. In order to authenticate a user of the mobile terminal 100, the plurality of control stations 120 link with an AAA (Authentication, Authorization, and Accounting) server 150.

In the case of a multi-BS (Base Station) connection, even though the mobile terminal 100 moves between cells, the base stations, or the control stations in one MBS zone while receiving an MBS, the mobile terminal 100 can receive the MBS without performing a registration process again in new environments. The control station 120 controls radio resource statuses of cells in the base station 110, and performs permission control for providing a service quality.

In order to provide the MBS, the control station 120 is connected to an MBS server 130, and has a control interface for connection establishing and authentication and a bearer interface for transmitting multicast packets. A security relationship is set between constituent elements in each wire channel, and signal messages are encrypted and exchanged there between.

Figure 2:
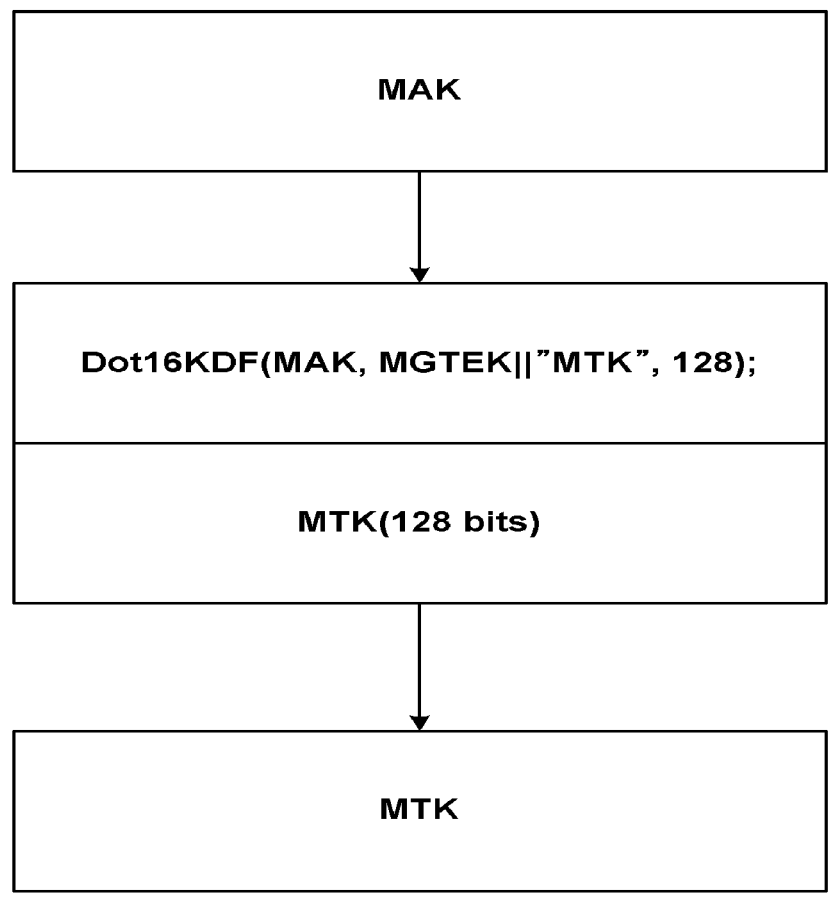
FIG. 2 is an exemplary view illustrating a security key creating process according to an exemplary embodiment of the present invention.

Referring to FIG. 2, a description is given to a security relationship that is required to provide an MBS to a plurality of mobile terminals in a wideband wireless access network.

FIG. 2 is an exemplary view illustrating a security key creating process according to an exemplary embodiment of the present invention.

As shown in FIG. 2, an MAK (Master Authentication Key) is allocated by the MBS server 130 in the case where the mobile terminals 100 are authenticated in order to transmit the MBS to the corresponding mobile terminals 100. The MAK is a root key for the MBS. In the exemplary embodiment of the present invention, a root key of 160 bits is exemplified, but the present invention is not limited thereto. The same MAK is allocated to the plurality of mobile terminals that receive the MBS.

An MGTEK (Multicast Group Traffic Encryption Key) is a key of 128 bits that is used to create a key commonly used for traffic encryption. The MBS server 130 allocates the MGTEK to the control station 120. An MTK (MBS Traffic Key) is used to protect the MBS traffic and is created by using the MAK and the MGTEK. In this case, since a method in which each key is created is already well-known, a detailed description thereof will be omitted in the exemplary embodiment of the present invention.

Figure 3:
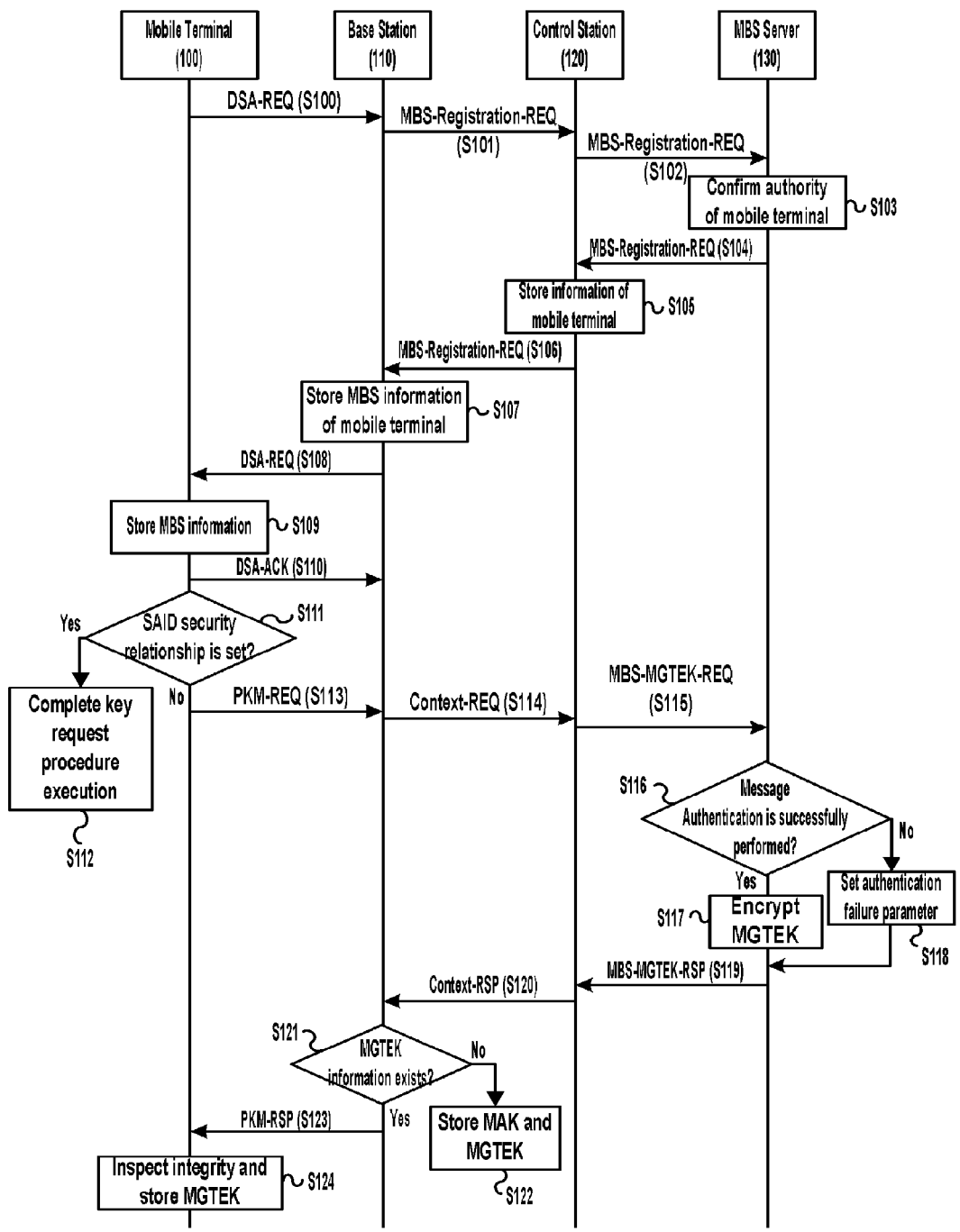
FIG. 3 is a flowchart illustrating a service registering process and a security key creating process for providing an MBS according to an exemplary embodiment of the present invention.
Figure 4:
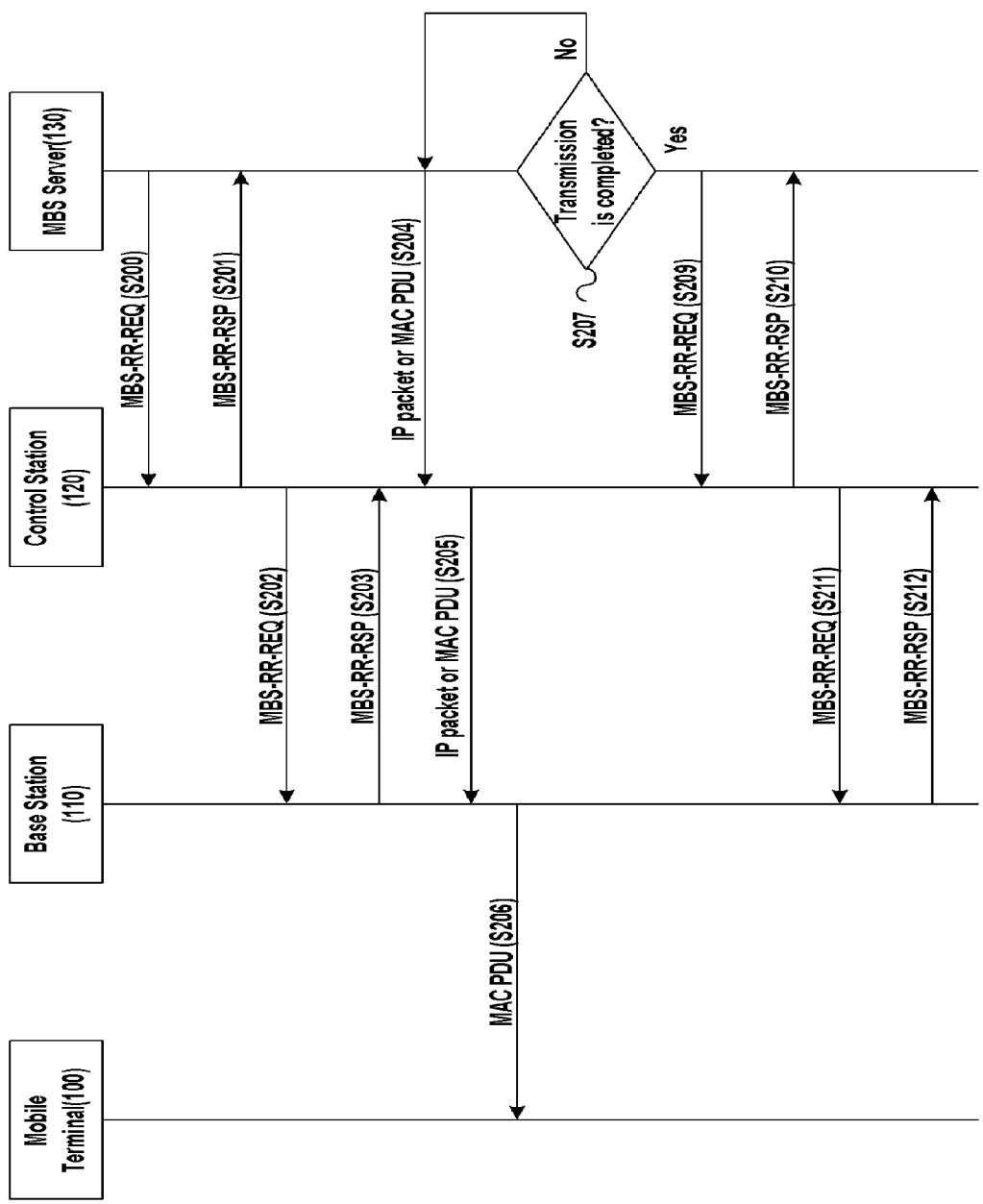
FIG. 4 is a flowchart illustrating an MBS connection setting process for providing an MBS according to an exemplary embodiment of the present invention.
Figure 5:
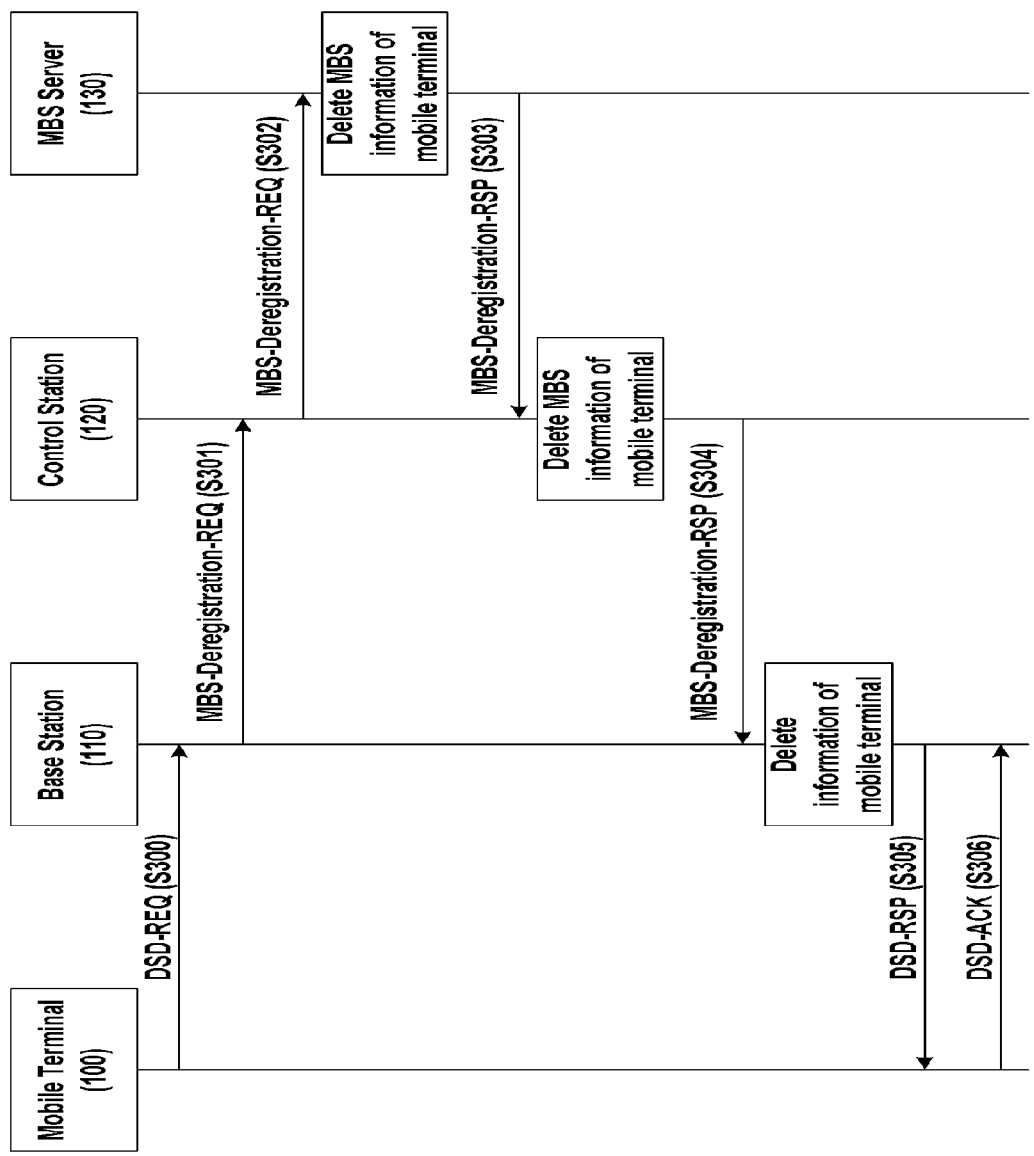
FIG. 5 is a flowchart illustrating an MBS connection releasing process and a service releasing process according to an exemplary embodiment of the present invention.

Referring to FIGS. 3 to 5, a description is given to a method of providing an MBS to a plurality of mobile terminals by using a security key that is created by the MBS server 130 in the wideband wireless access network.

FIG. 3 is a flowchart illustrating a service registering process and a security key creating process for providing an MBS according to an exemplary embodiment of the present invention. FIG. 4 is a flowchart illustrating an MBS connection setting process for providing an MBS according to an exemplary embodiment of the present invention. FIG. 5 is a flowchart illustrating an MBS connection releasing process and a service releasing process according to an exemplary embodiment of the present invention.

A plurality of processes, for example a service registering process, a security key creating process, an MBS connection setting process, an MBS connection and service releasing process, and the like are performed until the MBS is provided to the mobile terminal 100. First, in order for the mobile terminal 100 to receive the MBS, the mobile terminal 100 acquires program information for the MBS that is provided by the MBS server 130. And a MBS authentication process on the mobile terminal 100 is performed. This process can be performed by using an HTTP (HyperText Transfer Protocol) or any other known methods.

The mobile terminal 100 acquires basic program information for various MBS programs that are provided by the MBS server 130, for example IP addresses, ports, service time information, and the like. The MBS server 130 performs an authentication process on the mobile terminal 100. If the authentication process on the mobile terminal 100 is successfully performed, the mobile terminal 100 is allocated with the MAK from the MBS server 130.

If the mobile terminal 100 wants to receive one of a plurality of MBS programs that are received from the MBS server 130, the mobile terminal 100 performs a service registering process requesting to provide the desired MBS program, as shown in FIG. 3. The service registering process will be described in detail. The mobile terminal 100 transmits a DSA (Dynamic Service Allocation) request message (DSA_REQ) that includes a port and an IP address to discriminate the corresponding program, to the base station 110 (Step S100).

The base station 110 creates an MBS registration request message that includes an NAI (Network Access Identifier) or an MAC ID to discriminate the mobile terminal 100, and transmits the MBS registration request message to the control station 120 (Step S101). The control station 120 transmits the MBS registration request message received from the base station 110 to the MBS server 130 (Step S102).

The MBS server 130 determines whether the mobile terminal 100 has access authority on the MBS program requested from the corresponding mobile terminal 100 (Step S103). When the access authority on the MBS program is valid, the MBS server 130 stores registration information on a subscriber of the mobile terminal 100, and returns an MBS registration response message including a result value indicating success to the control station 120 (Step S104). In this case, the MBS registration response message includes QoS information, an mCID and an SAID (Security Association ID) for the corresponding MBS program. At this time, the SAID is included in the MBS registration response message to discriminate a security encryption key when encryption is required in the wireless channel.

The control station 120 stores information of the mobile terminal 100 (Step S105), and transmits the MBS registration response message to the base station 110 (Step S106). The base station 110 registers the MBS information of the mobile terminal 100 (Step S107), and transmits a DSA response message to the mobile terminal 100 (Step S108). The mobile terminal 100 stores the MBS information (Step S109), and responds with a DSA ACK message to the DSA response message (Step S110).

If the service registering process is completed through the above-described procedure, the mobile terminal 100 determines whether a security relationship is set in advance with respect to the received SAID (Step S111). If the security relationship is set in advance with respect to the SAID, the process is completed without performing a key request process, which will be described below (Step S112).

However, if the security relationship is not set in advance with respect to the SAID, a PKM request message is created by using a key request type, and a corresponding multicast traffic key (MGTEK) for the received SAID is requested (Step S113). The base station 110 includes the MGTEK for the received SAID in a context request message and transmits the context request message to the control station 120 (Step S114).

The control station 120 transmits a MBS-MGTEK request message to the MBS server 130 (Step S115). The MBS server 130 authenticates the received MBS-MGTEK request message by using an HMAC (Hashed Message Authentication Code)-Digest (Step S116). As the authentication result, when the authentication is succeed, the MBS server 130 encrypts the MGTEK as a traffic encryption key corresponding to the relevant program by using the MAK (Step S117), and transmits an MBS-MGTEK response message including the encrypted key to the control station 120 (Step S119). However, when the MBS server 130 fails in the message authentication, the MBS server 130 sets a parameter indicating the authentication failure to the MBS-MGTEK response message (Step S118) and transmits the MBS-MGTEK response message to the control station 120 (Step S119).

The control station 120 transmits the MBS-MGTEK response message to the base station 110 (Step S120).

The base station 110 determines whether to stores information of the MGTEK for the SAID or not (Step S121). When it is determined that the base station 110 does not have the information of the MGTEK for the SAID, the base station 110 stores the MAK and the MGTEK to encrypt a wireless channel (Step S122). However, when it is determined that the information already exists, the base station 110 transmits the PKM response message to the mobile terminal 100 (Step S123). The mobile terminal 100 inspects integrity of the PKM response message that is received from the base station 110, and stores the MGTEK that corresponds to the SAID (Step S124).

As described above, a process of transmitting contents of the MBS program is performed independently from the MBS service registering process and the key requesting process. As shown in FIG. 4, the MBS server 130 performs connection establishment for transmitting traffic from the MBS server 130 to the base station 110 before the contents of the MBS program start to be transmitted.

The MBS server 130 sets an MBS-RR request message for traffic connection establishment as a creation type and transmits the MBS-RR request message to each control station 120 corresponding to an MBS zone (Step S200). At this time, the MBS-RR request message that is transmitted to each control station 120 includes an mCID to discriminate the MBS program, MBS zone information, program start time information, QoS information, and the like. The control station 120 reserves a resource that corresponds to the QoS, and returns a MBS-RR response message to the MBS server 130 (Step S201).

The control station 120 sets a MBS-RR request message as a creation type and transmits the MBS-RR request message to each base station 110 that belongs to the corresponding MBS zone among the base stations 110 that are managed by the control station 120 (Step S202). The base station 110 stores the information of the received message, and uses it as information for packet scheduling. The base station 110 returns a MBS-RR response message to the control station 120 (Step S203).

If the corresponding program starts in accordance with the program start time information that is included in the MBS-RR request message, the MBS server 130 transmits the MBS contents to the control station 120 through tunneling (Step S204). At this time, in the case of a single BS connection, the MBS server 130 transmits the multicast IP packet. However, in the case of a multi-BS connection, the MBS server 130 transmits the multicast IP packet including the mCID and information for BS synchronization. In this case, the information for BS synchronization includes an OFDMA symbol offset and a sub-channel offset to designate a start location of an MBS burst during a downlink frame, the number of OFDMA symbols and the number of subchannels to designate a capacity of the MBS burst, and the like.

The control station 120 transmits the information of the received contents to the base stations 110 that belong to the corresponding MBS zone (Step S205). At this time, IP classifier information is used in the case of the single BS connection, and mCID information is used in the case of the multi-BS connection. The base station 110 performs scheduling on the corresponding contents according to the connection method and transmits the corresponding contents to the mobile terminal 100 (Step S206).

As such, after the bearer is set up according to the service start and the MBS is provided to the mobile terminal 100, if the program of the MBS is stopped, the setting of the connection for traffic transmission between the MBS server 130 and the base station 110 is released. That is, the MBS server 130 determines whether the traffic transmission is completed (Step S207). When it is determined that the traffic transmission is completed, the MBS server 130 sets the MBS-RR request message for releasing a traffic connection as a deletion type and transmits the MBS-RR request message to the control stations 120 corresponding to the mCID of the relevant program (Step S209).

At this time, the MBS-RR request message that is transmitted to the control stations 120 includes the mCID to discriminate the MBS program and MBS zone information. The control station 120 releases the allocated resource, and returns the MBS-RR response message to the MBS server 130 (Step S210). The control station 120 sets the MBS-RR request message as a deletion type and transmits the MBS-RR request message to the base station 110, which belongs to the corresponding MBS zone among the base stations 110 that are managed by the control station 120 (Step S211). The base station 110 deletes the corresponding information, and returns the MBS-RR response message to the control station 120 (Step S212).

Referring to FIG. 5, a description is given to the service releasing process in the case where the mobile terminal that is receiving the MBS service desires to stop the reception of the corresponding MBS. The mobile terminal 100 includes the corresponding mCID in a DSD (Dynamic Service Deletion) request message, and transmits the DSD request message to the base station 110 (Step S300). The base station 110 includes the information including the NAI to discriminate the mobile terminal 100 in an MBS-deregistration request message and transmits the MBS-deregistration request message to the control station 120 (Step S301).

The control station 120 transmits the MBS-deregistration request message to the MBS server 130 (Step S302). The MBS server 130 deletes information of the corresponding mobile terminal 100, and transmits the MBS-deregistration response message to the base station 110 through the control station 120 (Steps S303 and S304). The base station 110 deletes MBS registration information of the mobile terminal 100 and transmits a DSD response message to the mobile terminal 100 (Step S305). The mobile terminal 100 responds with a DSD-ACK message to the base station 110 with respect to the DSD response message (Step S306).

In the above description, the service registering process of the mobile terminal 100 shown in FIG. 3 and the service releasing process shown in FIG. 5 may be performed independently from the transmission process of MBS programs shown in FIG. 4. That is, during the transmission of the MBS programs, the service registering process and the service releasing process may be performed independently from each other in each mobile terminal 100.

However, if there is no mobile terminal 100 that requests the corresponding MBS program when the MBS contents start to be transmitted, the MBS server 130 does not transmit the MBS contents, and discards MBS packets generated at this time. Then, if first mobile terminal 100 requests to register a service, the MBS server 130 starts to transmit the contents. During the transmission of the MBS contents, if the finally registered mobile terminal 100 requests to release the service, the MBS server 130 discards MBS packets to be generated thereafter and does not transmit the contents.

In this case, a program that realizes a function corresponding to the structure according to the exemplary embodiment of the present invention and a recording medium that has the program recorded therein are within the range of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of providing a multicast broadcast service (MBS) from an MBS server to a mobile terminal, the method comprising:
    creating, by a base station, an MBS registration request message for a program of an MBS that the mobile terminal desires to receive, and transmitting, by the base station, the MBS registration request message to the MBS server that provides the corresponding MBS;
    receiving, by the base station, an MBS registration response message from the MBS server, the MBS registration response message including a security relationship identifier indicating information on an access authority of the mobile terminal with respect to the program of the MBS;
    transmitting, by the base station, a request message of a multicast traffic key corresponding to the security relationship identifier to the MBS server according to whether the security relationship identifier included in the MBS registration response message is set or not; and
    causing, by the base station, the MBS server to perform an authentication process on the mobile terminal, receiving, by the base station, a multicast traffic key response message including the multicast traffic key that is created by performing the authenticating process, storing, by the base station, the multicast traffic key, and transmitting, by the base station, a response message to the mobile terminal to complete a service registering process for receiving the corresponding MBS.

2. The method of claim 1, wherein the MBS registration request message includes an IP address and port information that correspond to the MBS to be provided to the mobile terminal, and an identifier to discriminate the mobile terminal.

3. The method of claim 2, wherein the multicast traffic key is used in creating the security relationship identifier that is used to encrypt the MBS in a wireless channel.

4. The method of claim 1, wherein the receiving of the MBS registration response message includes receiving information of the MBS provided to the mobile terminal from a control station and storing the information of the MBS.

5. The method of claim 4, wherein the MBS registration response message includes authority information for the mobile terminal, a multicast connection identifier, the security relationship identifier, and quality-of-service (QoS) information of the MBS.

6. The method of claim 4, further comprising, after the completing of the service registration:
    receiving an MBS release message from the mobile terminal, creating a service release request message including an identifier to discriminate the mobile terminal, and transmitting the service release request message to the MBS server that provides the MBS; and
    deleting, when a service release response message is received from the MBS server, the stored information of the MBS, and transmitting a service release completion message to the mobile terminal.

7. The method of claim 1, further comprising:
    causing the mobile terminal to receive a plurality of program information for the MBS from the MBS server, the plurality of program information including an IP address, a program providing port, and service time information for each program; and
    causing the mobile terminal to receive an authentication key indicating that the mobile terminal is successfully authenticated from the MBS server.

8. A method of providing a multicast broadcast service (MBS) to a mobile terminal by linking the mobile terminal to a control station in a mobile communication system, the method comprising:
    establishing a traffic connection to transmit a program of the MBS between mobile terminals and a MBS server;
    transmitting the program of the MBS to the mobile terminal through the control station by using the traffic connection; and
    releasing the set traffic connection, if the program of the MBS is completely transmitted, wherein, in the transmitting of the MBS program, in the case where a mobile terminal connection is a single base station connection, multicast IP packets are transmitted to the mobile terminal on the basis of the traffic connection;

wherein the setting of the traffic connection includes:

transmitting a traffic connection request message to the control station, the traffic connection request message including a multicast connection identifier to discriminate the program of the MBS that the mobile terminal receives, MBS zone information, program start time information, and quality-of-service (QoS) information; and receiving a traffic connection response message that includes resource information obtained on the basis of the QoS information, and wherein, in the transmitting of the MBS program, in the case where the mobile terminal connection is a multi-base stations connection, content information including the multicast connection identifier and information for Base Station (BS) synchronization is transmitted to one of multi-base stations on the basis of the traffic connection.

9. The method of claim 8, wherein the information for BS synchronization includes symbol offset information and sub-channel offset information to designate a start location of an MBS burst during a downlink frame, and the number of symbols and the number of sub-channels to designate a capacity of the MBS burst.

10. The method of claim 8, wherein the releasing of the traffic connection includes:

transmitting a traffic connection release request message to the control station, the traffic connection release request message requesting to release the traffic connection is sent to the mobile terminal that corresponds to the multicast connection identifier of the MBS program; and releasing a resource that is allocated to the mobile terminal on the basis of the traffic connection release request message, and receiving a traffic connection release response message including information on the result of releasing the resource from the control station.

11. The method of claim 10, wherein the traffic connection release request message includes the multicast connection identifier to discriminate the MBS program and information of an MBS zone that is a group of mobile terminals receiving the MBS program.

* * * * *